CONTROL CIRCUIT FOR TAPE DRIVE MECHANISM

Filed Dec. 7, 1961

Inventors:
Herman Epstein and
Andrew E. Trolio
By: Ray E. Snyder Atty.

United States Patent Office 3,185,911
Patented May 25, 1965

3,185,911
CONTROL CIRCUIT FOR TAPE DRIVE MECHANISM

Herman Epstein, Philadelphia, and Andrew E. Trolio, Broomall, Pa., assignors to Omnitronics, Inc., Philadelphia, Pa., a corporation of Delaware
Filed Dec. 7, 1961, Ser. No. 157,722
4 Claims. (Cl. 318—275)

This invention relates to a control circuit for a coded tape reader or other instrument utilizing a tape driving mechanism.

A primary object of the present invention is to provide an improved control circuit for a tape reader or similar device that offers increased flexibility in operation over existing devices.

More particularly, it is an object to provide a control circuit for a tape driving mechanism that includes a capstan for driving the tape and a brake for stopping the tape, a power switch for energizing the circuit, a manual Start-Stop switch for starting or stopping the tape at will, and a Load Tape-Ready switch that is operable to de-energize both the capstan and brake in the Load Tape position for initially threading the tape through the drive mechanism.

It is a more particular object to provide a control circuit of the type described in which turning the power switch On is effective to automatically establish a Stop condition for the tape drive mechanism.

It is another object to provide a control circuit of the type described in which switching the Load Tape-Ready switch to a Load Tape position automatically de-energizes both the brake and the capstan so that the tape can be threaded through the driving mechanism; and switching to the Ready position automatically establishes a Stop condition.

It is still another object to provide a circuit of the type described for a coded tape reader that is operable when the Stop switch is on to provide an inhibit output effective to prevent the reading of characters on the tape while it is being moved manually past the light pick-up head.

It is still another object to provide a circuit of the type described wherein, with the Load Tape switch in the Load Tape position, pressing the Start switch will not start the tape.

The invention consists of the novel constructions, arrangements, and devices to be hereinafter described and claimed for carrying out the above stated objects and such other objects as will be apparent from the following description of the preferred form of the invention, illustrated with reference to the accompanying drawing, wherein:

Figure 1:
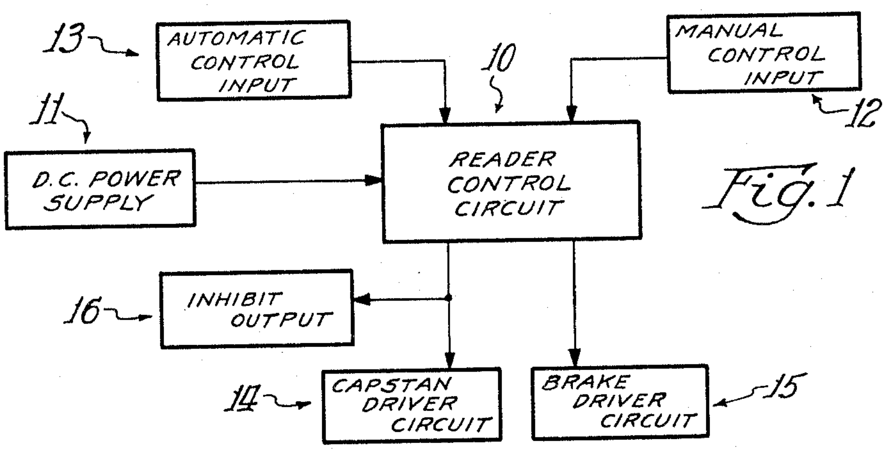
FIG. 1 is a block diagram of the control circuit of the present invention.

Referring to FIG. 1, the reader control circuit is designated generally by the numeral 10 and is connected to a D.C. power supply 11. The control circuit 10 has connected to it a manual control input 12 and an automatic control input 13. The control circuit 10 provides output signals for controlling a capstan driver circuit 14 and a brake driver circuit 15. In addition, an inhibit output 16 is connected to the reader control circuit 10 which provides an inhibit output signal to a reader for preventing the reading of characters when the tape is moved manually past the light sensitive head.

Figure 2:
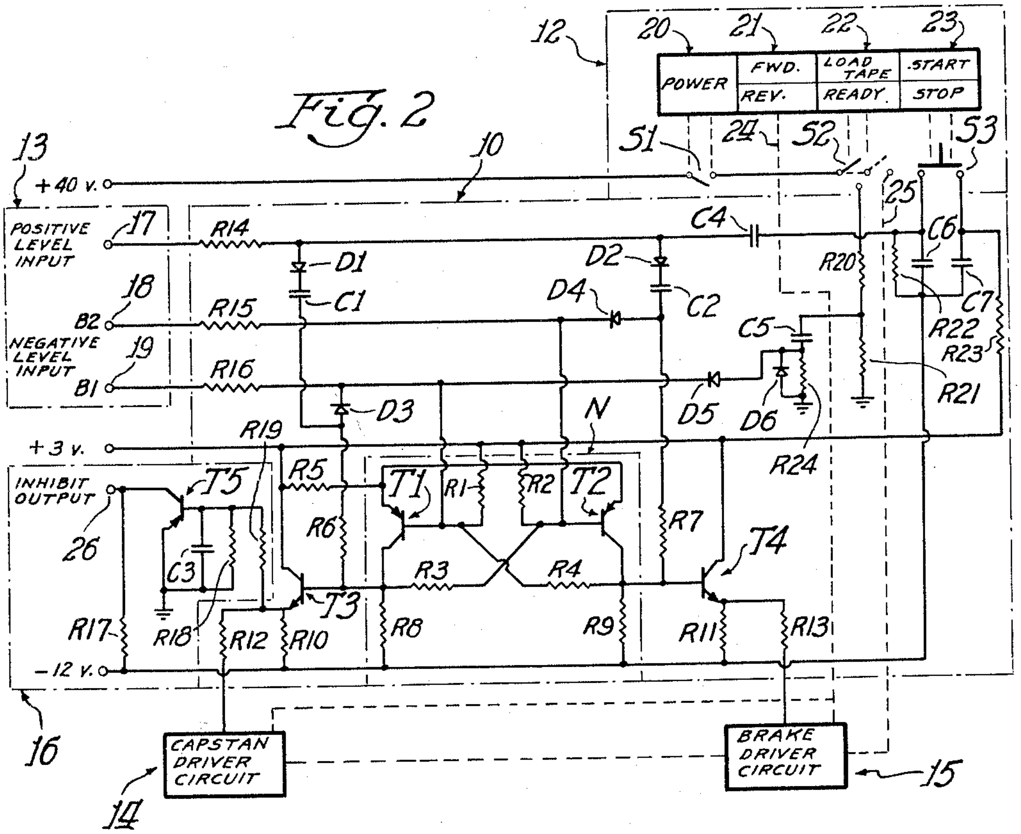
FIG. 2 is a schematic diagram, partially in block form, of the control circuit of FIG. 1.

Referring to FIG. 2, the control circuit 10 includes a bistable network N comprising transistors T1 and T2, and resistors R1, R2, R3, R4, R5, R8, and R9. The bistable network N has two output conductors, each connected to an emitter follower circuit. One emitter follower circuit includes the transistor T3 and resistors R10 and R12. The base of transistor T3 is connected to the collector of the transistor T1 and the emitter of the transistor T3 is connected through the resistor R12 to the capstan driver circuit 14.

The other emitter follower circuit includes transistor T4, and resistors R11 and R13. The base of the transistor T4 is connected to the collector of the transistor T2 and the emitter of the transistor T4 is connected through the resistor R13 to the brake driver circuit 15.

The automatic control input 13 includes a positive voltage input terminal 17 and two negative level input terminals 18 and 19. The automatic control inputs are connected to the bistable network as follows:

The positive pulse input terminal 17 is coupled through resistor R14, diode D1, capacitor C1, and resistor R6 to the collector of transistor T1 and base of transistor T3. The terminal 17 is also coupled through diode D2, capacitor C2, and resistor R7 to the collector of transistor T2 and base of transistor T4. The terminal 17 is also coupled through the diode D1, capacitor C1, and diode D3 to the base of the transistor T1, and through the diode D2, capacitor C2, and diode D4 to the base of the transistor T2. A positive pulse supplied through the terminal 17 to transistors T1 and T2 is effective to turn off the transistor that is then in a state of conduction.

The terminal 18 is coupled through resistor R15 directly to the base of transistor T2 and through diode D4 and resistor R7 to the base of the transistor T4. The terminal 19 is coupled through resistor R16 directly to the base of transistor T1, and through diode D3 and resistor R6 to the base of transistor T3.

The manual control input 12 includes a power switch 20, a Forward-Reverse switch 21, a Load Tape-Ready switch 22, and a Start-Stop switch 23. The power switch 20 is shown as a switch S1 connected directly to a positive 40 volt D.C. power line. However, it is to be understood that the power switch is effective to control all of the D.C. power to the control circuit.

The Forward-Reverse switch 21 is connected directly as shown by dotted line 24 to the capstan driver circuit 14 and brake driver circuit 15. The forward-reverse operation is controlled at the capstan driver circuit 14 and the brake driver circuit 15 by means of a suitable relay circuit and the switch 21 does not provide a direct input to reader control circuit 10.

The Load Tape-Ready switch 22 includes the switch S2 which is effective to connect the 40 volt D.C. line to the reader circuit control 10. The switch S2 is also connected as shown by dotted line 25 to the brake driver circuit 15 and capstan driver circuit 14 for de-energizing these circuits when the switch S2 is in the Load Tape position. In the Load Tape position, the switch S2 is open, and in the Ready position the 40 volt D.C. line is coupled through resistor R20, capacitor C5, and diode D5 to the base of transistor T1. Closing the switch is effective to provide a positive going pulse directly to the base of the transistor T1 and if it is in an on condition the pulse turns it off, thereby assuring that the capstan driver circuit 14 is de-energized and the brake circuit 15 is energized for establishing the stop condition. The switch S2 is also coupled through resistors R20 and R21 to ground, and capacitor C5 is coupled through a parallel network of diode D6 and resistor R24 to ground. The parallel network of resistor R24 and diode D6 is effective to clip off any negative going pulses or oscillation produced when the positive voltage is supplied through switch S2 to the transistor T1.

The Start-Stop switch 23 includes a push button switch S3 which is operable when closed to supply a positive pulse to the positive pulse inputs of the bistable network of the control circuit 10.

In the Start-Stop circuit including switch 23, one pole of the switch S3 is coupled through capacitor C4 and resistor R14 to the positive level automatic Start-Stop input terminal 17, and through a parallel network comprising resistor R22 and capacitor C6 to a −12 volt D.C. line. The −12 volt D.C. line is also connected to one end of the resistors R8, R9, R10, and R11. The other pole of the switch S3 is coupled through capacitor C7 to the −12 volt D.C. line and through resistor R23 to a +3 volt D.C. line. The +3 volt D.C. line is also connected to one end of the resistors R1 and R2 and R5 and to the collectors of transistors T3 and T4.

An inhibit output circuit 16 includes a transistor T5, capacitor C3, and resistors R17, R18, and R19. The base of transistor T5 is coupled through resistor 19 to the emitter of transistor T3, and the collector of transistor T5 is connected to one end of resistor R17 and to an inhibit output terminal 26. The other end of resistor 17 is connected to the −12 volt D.C. line. The capacitor C3 and resistor R18 are connected in parallel between the base and emitter of transistor T5, the emitter of which is also connected to ground.

*Operation*

In operation, the control circuit 10 is operable to control the capstan driver circuit 14 and brake driver circuit 15 as follows:

Power to the reader control circuit 10 is provided by depressing the power switch 20 which makes D.C. voltage available at the Load Tape-Ready switch 22. In the Load Tape position, no voltage is provided through the switch S2 to the bases of the transistor T1 or T2. Also, in the Load Tape position, both the capstan driver circuit 14 and the brake driver circuit 15 are de-energized through the open circuit in connection 25. Pressing the Ready button closes the switch S2 and provides a positive voltage pulse through resistor R20, capacitor C5, and diode D5 to the base of transistor T1. If this transistor T1 is in a state of conduction, this pulse will be effective to turn it off. Turning off the transistor T1 is effective to provide a negative going signal through resistor R3 to the base of transistor T2 to turn it on. Turning on the transistor T2 is effective to supply signal current through transistor T4 and resistor R13 to the brake driver circuit 15 and insure that it is energized. The reader thereby is placed in a stop condition.

This stop condition is provided regardless of the position of the Start-Stop switch 23. The reader is started by pushing the Start-Stop button 23 and thereby momentarily closing the switch S3. The capacitor C7 was initially charged to a potential of 15 volts through the connection provided from the +3 volts D.C. line and resistor R23 to the −12 volts D.C. line. Closing the switch S3 effectively provides a 15 volt pulse through the capacitor C4, diodes D1 and D2, capacitors C1 and C2, and diodes D3 and D4, to the bases of the transistors T1 and T2. Whichever one of the transistors, T1 or T2, is in the state of conduction will be turned off and the other will be turned on. Pressing the Start-Stop button 23 is effective to provide such a pulse for either starting or stopping so that each of the transistors T1 and T2 will be switched from one state of conduction to the other whenever the switch S3 is closed.

The control circuit may be switched to the Start or Stop condition automatically by providing pulses through the terminal 17. These positive pulses are effective to switch the transistors T1 and T2 from one state of conduction to the other for every pulse supplied.

Negative level pulses may be provided to control the circuit 10 through the terminals 18 and 19. A negative going pulse supplied through the terminal 18 is transmitted through resistor R15 directly to the base of transistor T2. If this transistor is off, such a pulse will trigger it into conduction. If the transistor T2 is already in a state of conduction, the negative pulse has no effect.

Similarly, a negative pulse supplied through the terminal 19 is transmitted through resistor R16 directly to the base of the transistor T1. If this transistor is off, such a pulse will trigger it into conduction, but if it is already in a state of conduction, this pulse has no effect.

The capacitor C6 and the resistor R22 are provided to prevent double pulsing or supplying an alternative pulse when the switch S3 is opened rather than when it is closed.

The control circuit 10, herein described is particularly useful in conjunction with a photoelectric tape reader as described in pending application of Herman Epstein No. 121,037, filed June 30, 1961, but it is contemplated this control circuit may be useful in other types of reader or recording circuits.

The inhibit output circuit 16 is sensitive to the condition of the capstan driver circuit and provides an inhibiting output to the tape reader or other device whenever the capstan driver circuit 14 is de-energized. The capstan driver circuit 14 in turn is de-energized whenever the transistor T3 is in an off or non-conducting state. When the transistor T3 is not conducting, a voltage divider network is provided between the −12 volt D.C. line through resistor R10, R19, and R18 to ground. The base of transistor T5, therefore, is at a negative potential and is caused to conduct, effectively placing the emitter and collector of the transistor T5 at ground potential. No output signals can then be transmitted through the output terminal 26. The output terminal 26 is effectively placed at ground potential and inhibits any output signals that may be provided by the sprocket channel circuit or other circuit to be inhibited.

When the transistor T3 is in a state of conduction, the capstan driver circuit 14 is energized and the emitter of transistor T3 is effectively at +3 volts by virtue of the connection through the collector to the positive 3 volt line. With a positive potential at one end of resistor R19, the base of transistor T5 is caused to be positive and it is turned off. When the transistor T5 is off, the potential at the inhibit output terminal 26 effectively drops to a potential of −12 volts by virtue of the connection through resistor R17 to the −12 volt D.C. line. The inhibit output terminal 26 thereby establishes a negative voltage level permitting output signals to be transmitted through the reader circuit previously inhibited. It should be understood that the inhibit circuit herein described is by way of example only and could be modified to effectively ground out positive pulses as well, or effectively establish a positive D.C. voltage level at the inhibit output terminal 26.

CIRCUIT COMPONENTS

The circuit component just described may be of the type, or have the values, as listed below:

*Capacitors*

| | Mf. |
|---|---|
| C1 | .002 |
| C2 | .002 |
| C3 | 1 |
| C4 | .002 |
| C5 | 1 |
| C6 | .002 |
| C7 | .02 |

*Diodes*

| | |
|---|---|
| D1 | 1N274 |
| D2 | 1N274 |
| D3 | 1N279 |
| D4 | 1N279 |
| D5 | 1N279 |
| D6 | 1N279 |

*Resistors*

| | |
|---|---|
| R1 | 12K |
| R2 | 12K |

*Resistors*—Continued

| | | |
|---|---|---|
| R3 | | 39K |
| R4 | | 39K |
| R5 | ohms | 100 |
| R6 | | 12K |
| R7 | | 12K |
| R8 | | 2.2K |
| R9 | | 2.2K |
| R10 | | 2.2K |
| R11 | | 2.2K |
| R12 | ohms | 100 |
| R13 | do | 100 |
| R14 | | 1K |
| R15 | | 39K |
| R16 | | 39K |
| R17 | | 1K |
| R18 | | 22K |
| R19 | | 1K |
| R20 | | 47K |
| R21 | | 100K |
| R22 | | 390K |
| R23 | | 1M |
| R24 | | 100K |

*Transistors*

| | |
|---|---|
| T1 | 2N404A |
| T2 | 2N404A |
| T3 | 2N1304 |
| T4 | 2N1304 |
| T5 | 2N404 |

There has been provided by this invention an improved control circuit for a Photoelectric Tape Reader or a similar instrument having a driving circuit and a brake circuit for the recording medium. While the control circuit has been described particularly for use with a Photoelectric Tape Reader, it is to be understood that the control circuit can be equally useful in controlling any instrument that is operable to drive or stop a recording medium such as a magnetic tape or rotating disc.

The control circuit herein described is effective to establish a stop condition when the power switch is initially turned on regardless of the operative positions of the Load-Tape or the Start-Stop switch. If the Load Tape-Ready switch is in the Load Tape position, the capstan driver circuit and the brake driver circuit are already de-energized so that a stop condition is established. If the Load Tape-Ready switch is in the Ready position, a positive going pulse is supplied for de-energizing the capstan driver circuit and for energizing the brake driver circuit, thereby also establishing a stop condition. The capstan driver circuit for driving the tape is then energized by pressing the Start-Stop button. This provides a positive going pulse to the transistor of the bistable circuit which controls the brake driver circuit to turn it off, and thereby turn on the transistor that controls the capstan driver circuit.

The control circuit herein described provides an additional degree of flexibility in the operation of a tape reader and also provides an inhibit output for preventing the reading of characters on the tape or on the recording medium when the tape is moved manually or is not being driven by the capstan driver circuit.

While this invention has been described in connection with certain specific embodiments thereof, it is to be understood that this is by way of illustration and not by way of limitation and the scope of this invention is defined solely by the appended claims which should be construed as broadly as the prior art will permit.

We claim:

1. In a control arrangement for regulating operation of a drive means and a brake means including energy input means and a bistable network operative in a first state to deenergize the drive means and energize the brake means and operative in a second state to energize the drive means and deenergize the brake means, the improvement which comprises first switching means operative in a first position to maintain both said drive means and said brake means deenergized and operative in a second position to complete a portion of a circuit for placing said bistable network in said first state, and second switching means, operative in a first position to interrupt said circuit and operative in a second position to complete another portion of said circuit, actuation of said second switching means to its second position when said first switching means is in its second position being effective to complete the circuit for placing said bistable network in the first state and thereby energize said brake means.

2. In a control arrangement for regulating operation of a drive means and a brake means including energy input means and a bistable network operative in a first state to deenergize the drive means and energize the brake means and operative in a second state to energize the drive means and deenergize the brake means, the improvement which comprises first switching means operative in a first position to maintain both said drive means and said brake means deenergized and operative in a second position to complete a portion of a circuit for placing said bistable network in said first state, second switching means, operative in a first position to interrupt said circuit and operative in a second position to complete another portion of said circuit, actuation of said second switching means to its second position when said first switching means is in its second position being effective to complete the circuit for placing said bistable network in the first state and thereby energize said brake means, and third switching means, coupled to said network, operative responsive to each actuation thereof to effect transmission of a pulse to said network and switch the network from one to the other of its stable states.

3. In a control arrangement for regulating operation of a drive means and a brake means including energy input means and a bistable network operative in a first state to deenergize the drive means and energize the brake means and operative in a second state to energize the drive means and deenergize the brake means, the improvement which comprises first switching means operative in a first position to maintain both said drive means and said brake means deenergized and operative in a second position to complete a portion of a circuit for placing said bistable network in said first state, second switching means, operative in a first position to interrupt said circuit and operative in a second position to complete another portion of said circuit, actuation of said second switching means to its second position when said first switching means is in its second position being effective to complete the circuit for placing said bistable network in the first state and thereby energize said brake means, and signal circuit means, coupled to the signal path between the bistable network and the drive means, operative to continuously provide a first output signal when said drive means is deenergized and to continuously provide a second output signal when said drive means is energized.

4. In a control arrangement for regulating energization of a capstan driver circuit and a brake driver circuit including an energy input conductor, and a pair of transistors intercoupled in a bistable network such that in the first state of the network conduction of one transistor effects energization of the brake driver circuit and deenergization of the capstan driver circuit and in the second state of the network conduction of the other transistor effects energization of the capstan driver circuit and deenergization of the brake driver circuit, said bistable network having a first signal input path for applying an input pulse to effect conduction of said one transistor and energize the brake driver circuit and a second signal input path for applying pulses simultaneously to both transistors to change the state of the network, the improvement which comprises a load tape-ready switch, connected to effect deenergization of both said capstan driver circuit and said brake driver circuit when said switch is opened and, responsive to closure of said switch, to complete a portion of said first signal input path, a power on-off switch, intercoupled between said energy input conductor and said load tape-ready switch, operative upon closure of the on-off switch when said load tape-ready switch is already closed to complete the first signal input path and effect transmission of a pulse thereover to insure that the brake driver circuit is energized, a start-stop switch connected to effect, responsive to each actuation thereof, transmission of simultaneous pulses over said second signal input path and thereby reverse both the state of the network and the energized conditions of the capstan driver circuit and the brake driver circuit, and an inhibit circuit, coupled between said other transistor of the bistable network and said capstan driver circuit, operative responsive to conduction of said other transistor and energization of the capstan driver circuit to provide a first output signal for enabling associated equipment, and operative responsive to non-conduction of said other transistor and deenergization of said capstan driver circuit to provide a second output signal for disabling the associated equipment.

References Cited by the Examiner

UNITED STATES PATENTS

| | | | |
|---|---|---|---|
| 2,680,794 | 6/54 | Ballon | 200—159 |
| 2,819,841 | 1/58 | Blashfield | 235—61.115 X |
| 2,864,609 | 12/58 | Trimble | 226—39 |
| 2,877,012 | 3/59 | Angel et al. | 226—39 |
| 3,002,671 | 10/61 | Brumbaugh et al. | 226—39 |

FOREIGN PATENTS

| | | |
|---|---|---|
| 331,346 | 8/58 | Switzerland. |

ORIS L. RADER, *Primary Examiner.*

MILTON O. HIRSHFIELD, *Examiner.*